United States Patent [19]

Hergenrother et al.

[11] 4,221,898
[45] Sep. 9, 1980

[54] POLYPHOSPHAZENE POLYMERS CONTAINING ORTHO-DIFUNCTIONAL PHENYLENE SUBSTITUTENTS

[75] Inventors: William L. Hergenrother, Akron; Adel F. Halasa, Bath, both of Ohio

[73] Assignee: The Firestone Tire & Rubber Company, Akron, Ohio

[21] Appl. No.: 941,113

[22] Filed: Sep. 8, 1978

[51] Int. Cl.³ ............................ C08G 79/04; C08G 73/00
[52] U.S. Cl. ................................. 528/168; 528/374; 528/399
[58] Field of Search ...................... 528/399, 168, 374

[56] References Cited

U.S. PATENT DOCUMENTS

| | | | |
|---|---|---|---|
| 2,866,773 | 12/1958 | Redfarn | 528/168 |
| 3,344,087 | 9/1967 | Becke | 528/399 |
| 3,893,980 | 7/1975 | Allcock et al. | 528/328 |

*Primary Examiner*—Wilbert J. Briggs, Sr.

[57] ABSTRACT

Polyphosphazene polymers are prepared which contain repeating units represented by the formula:

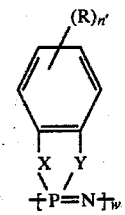

wherein X and Y are the same or different and are selected from the group consisting of:
—$CH_2O$—, —O—, —S—, and —NH—;

and R is selected from the group consisting of halogen, cyano, nitro, alkoxy and alkyl radicals containing from 1 to 12 carbon atoms; $n' = 0$ to 4; and $20 \leq w \leq 50,000$ per polymer. The polymers of the invention can contain a mixture of different ortho-difunctional phenylene substituents.

The polymers of the invention can be utilized to form protective films and can also be utilized in applications such as for molding, coatings, foams, fibers and the like.

10 Claims, No Drawings

POLYPHOSPHAZENE POLYMERS CONTAINING ORTHO-DIFUNCTIONAL PHENYLENE SUBSTITUTENTS

BACKGROUND OF THE INVENTION

Polyphosphazene polymers containing repeating

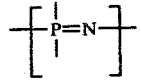

units in which various alkoxy, substituted alkoxy, aryloxy, substituted aryloxy, amino and mercapto groups are attached to the phosphorus atom and their method of preparation are described in the prior art as illustrated in the publication "Phosphorus-Nitrogen Compounds", Academic Press, New York, New York, 1972 by H. R. Allcock and "Poly(Organophosphazenes)", Chemtech, Sept. 19, 1975, by H. R. Allcock and in such as U.S. Pat. Nos. 3,515,688; 3,702,833; 3,856,712; 3,974,242; and 4,042,561.

U.S. Pat. No. 2,866,773 to Redfarn, discloses the reaction of compounds such as ortho-difunctional phenylene compounds with a polyphosphonitrilic backbone, but contrary to the present invention, Redfarn reacts only one functional group with the polymer backbone and uses the remaining functionality to crosslink the polymer with materials such as hexamethylenetetramine to form a thermosetting resin unlike the thermoplastic resins produced by the present invention.

Furthermore, in "Phosphonitrilic Compounds.XV.", Inorganic Chemistry, Vol. 11, No. 11, 1972, by H. R. Allcock et al, pages 2584–2590, it is stated that upon the treatment of poly(dichlorophosphazene) in tetrahydrofuran with o-phenylenediamine, in the presence of triethylamine, the amine hydrochloride salt is formed and gellation of the mixture occurs rapidly to produce a crosslinked polymer which is unstable to atmospheric moisture.

SUMMARY OF THE INVENTION

This invention relates to polyphosphazene homopolymers and copolymers containing repeating

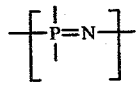

units in the polymer chain in which orthodifunctonal phenylene substituents are attached to the phosphorus atom and to a method of preparing such polymers. Optionally, a mixture of different orthodifuctional phenylene groups may be substituted onto the polyphosphazene backbone if they do not hinder the substitution of each other in forming a compatible copolymer.

DETAILED DESCRIPTION OF THE INVENTION

The polymers of the invention contain repeating units represented by the formula:

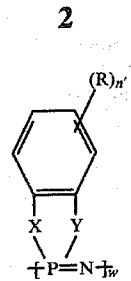

where X and Y are the same or different and are selected from the group consisting of: $-CH_2O$, $-O-$, $-S-$, and $-NH-$; wherein R is selected from the group consisting of halogen, cyano, nitro, alkoxy, and alkyl radicals containing from 1 to 12 carbon atoms; $n'=0$ to 4. The polymer can contain from 20 to 50,000 of such units and the polymers of the invention can contain a mixture of different ortho-difunctional phenylene substituents.

It is understood that when all of the ortho-difunctional phenylene substituents are the same a homopolymer is formed. Furthermore, it should be understood that while it is preferable that all ortho-difunctional phenylene substituents be the same, that the ortho-difunctional phenylene substituents may be mixtures of different ortho-difunctional phenylene derivatives and thus form a copolymer. All substituents are apparently randomly distributed in the polymer units.

The ortho-difunctional phenylene substituted polyphosphazene polymers of the invention have substantial heat stability.

The polymers of the invention can be used to prepare protective films and may be utilized in applications such as moldings, coatings, foams, fibers and the like.

The term polymer as used in the specification includes within its meaning both the homopolymer where only one ortho-difunctional phenylene compound is substituted on the polyphosphazene polymer and copolymers where more than one ortho-difunctional phenylene compound is substituted on the polyphosphazene polymer.

METHOD OF PREPARATION

The polyphosphazene polymers of this invention are prepared by reacting a poly(dichlorophosphazene) polymer having the structure $-(NPCl_2)_n-$, in which n is from 20 to 50,000 with an ortho-difunctional phenylene compound in the presence of a tertiary amine, the ortho-difunctional phenylene compound being used, either alone, or in a mixture with other ortho-difunctional phenylene compounds which are substitutionally reactive with the phosphazene nucleus.

I. THE POLY(DICHLOROPHOSPHAZENE) POLYMER

Poly(dichlorophosphazene) polymers which are employed as starting materials in the process of this invention are well known in the art as illustrated in U.S. Pat. Nos. 3,370,020; 4,005,171; and 4,055,520 and the aforementioned publications of H. R. Allcock, the disclosures of which are incorporated herein by reference.

These polymers have the general formula $-(NPCl_2)_n-$, in which n may range from 20 to 50,000 or more. As described in the aforementioned references, the polymers are in general prepared by the thermal polymerization of cyclic oligomers having the formula $(NPCl_2)_m$, in which m is an integer from 3 to 7, with the cyclic trimer and tetramer often comprising up to 90% of the oligomers, the ratio of trimer to tetramer varying with the method of manufacture.

The specific conditions of temperature, pressure and time employed in the thermal polymerization of the cyclic oligomers can vary considerably depending on whether or not the polymerization is catalyzed. Thus, temperatures can range from about 130° C. to about 300° C., pressures can range from a vacuum of less than about $10^{-1}$ Torr to superatmospheric and times can range from 30 minutes to about 48 hours.

A preferred process for preparing the poly(dichlorophosphazene) polymers used in the process of this invention is described in the aforementioned incorporated U.S. Pat. No. 4,005,171.

II. ORTHO-DIFUNCTIONAL PHENYLENE COMPOUNDS

Ortho-difunctional phenylene compounds which can be used to prepare the polymers of the invention are represented by the following structural formula:

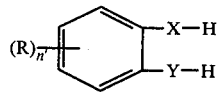

wherein X and Y are the same or different and are selected from the group consisting of: —CH$_2$O—, —O—, —S—, and —NH—; R is selected from a group consisting of halogen, cyano, nitro, alkoxy and alkyl radicals containing from 1 to 12 carbon atoms; and n'=0 to 4. Illustrative examples of ortho-difunctional phenylene compounds which can be employed are catechol (1,2-benzenediol), o-phenylene-diamine; 1,2-dimercaptobenzene; o-hydroxy benzyl alcohol; o-amino-thiophenol; o-amino-phenol and the like.

The phenyl group can be substituted with halogen, cyano, nitro, or alkyl or alkoxy radicals containing 1 to 12 carbon atoms in addition to its ortho-difunctionality. Illustrative examples of compounds which can be employed include 4-tert-butylcatechol; 3-methylcatechol; 3-methyl-1,2-phenylenediamine; 4-tert-butyl-2-hydroxybenzyl alcohol; 4-nitro-1,2-phenylenediamine; 4-cyano-1,2-phenylenediamine; 4-methyl-2-aminothiophenol; 1,2-dihydroxy-3,5-dimethylbenzene; 1,2-dihydroxy-3, 4,5,6-tetrachlorobenzene; 1,2-diamino-3,5-dichlorobenzene; 1,2-diamino-4-methoxybenzene; 1,2-diamino-3-nitrobenzene; 1,2-diamino-4-methylbenzene and the like.

IV. THE TERTIARY AMINE

The use of tertiary amine in preparing the polymers of the invention minimizes undesirable side reactions and at the same time acts as an effective acid scavenger.

Tertiary amines which can be employed in preparing the polymers of the invention are those represented by the general structure:

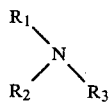

wherein R$_1$, R$_2$, and R$_3$ can each be alkyl containing from 1 to 8 carbon atoms. Thus, for example, the tertiary amine can be a trialkyl amine such as trimethylamine, triethylamine, tri-isopropylamine, tri-n-propylamine, tri-isobutylamine, tri-n-butylamine, and the like. In addition, tertiary amines such as pyridine and those containing diamine groups such as N,N,N',N'-tetramethylethylene diamine (TMEDA) can also be utilized.

The preferred tertiary amines for use in preparing the polymers of the invention are triethylamine; N,N,N',N'-tetramethylethylene diamine; pyridine; N-methyl morpholine; N-methyl pyrrole; 1,4-diaza-bicyclo (2·2·2) octane (DABCO) and dipiperidyl ethane.

As indicated above, the polymers of the present invention are prepared by reacting the poly(dichlorophosphazene) polymer and the ortho-difunctional phenylene compound in the presence of a tertiary amine. Optionally other ortho-difunctional phenylene compounds which can be compatibly substituted onto the poly(dichlorophosphazene) in the presence of a tertiary amine may be employed in the reaction mix.

The specific reaction conditions and proportion of ingredients employed in preparing these polymers can vary somewhat depending on factors such as the reactivity of the specific ortho-difunctional phenylene compound utilized, the particular tertiary amine employed, and the degree of substitution desired in the finished polymer. In general, reaction temperatures can range from about 25° C. to about 200° C. and times can range from 3 hours up to 7 days; lower temperatures necessitating longer reaction times and higher temperatures allowing shorter reaction times. These conditions are, of course, utilized in order to obtain the most complete reaction possible, i.e., in order to insure the substantially complete conversion of the chlorine atoms in the polymer to the corresponding cyclic ester of the ortho-difunctional phenylene compound.

The above reaction is ordinarily carried out in the presence of a solvent. The solvent employed in the reaction should be a solvent for both the poly(dichlorophosphazene) polymer, the ortho-difunctional phenylene compound and the tertiary amine. Examples of suitable solvents which can be employed include diglyme, triglyme, tetraglyme, cyclohexane, chloroform, dioxane, dioxolane, methylene chloride, toluene, xylene, and tetrahydrofuran. The amount of solvent employed is not critical and any amount sufficient to solubilize the reaction mixture materials can be employed. In addition, the materials in the reaction zone should be reasonably free of water. The prevention of substantial amounts of water in the reaction system is necessary in order to inhibit the undesirable sidereaction of the available chlorine atoms in the chloropolymer. Preferably the reaction mixture should contain less than about 0.01% water.

In general, the amount of the ortho-difunctional phenylene compounds employed in the process should be at about stoichiometrically equivalent to the number of available chlorine atoms in the polymer mixture. A slight excess of the difunctional compound sufficient to insure complete reaction of chlorine is preferred. Sufficient excess to cause non-cyclic substitution (about 2 moles of difunctional compound to mole of available chlorine), should be avoided.

While the ortho-difunctional phenylene substituted poly(phosphazene) polymers of the present invention have been prepared in the above-identified manner, that is, in the presence of a tertiary amine, alternative methods of preparation are available. The prior art methods of poly(dichlorophosphazene) substitution such as by reaction with sodium alkoxide as demonstrated in U.S.

Pat. No. 3,370,020 to Allcock et al may be used to substitute some of the cyclic substituent groups in cases where the presence of sodium or alkoxide will not result in undesirable side-reactions.

The following examples are submitted for the purpose of further illustrating the nature of the present invention and are not intended as a limitation on the scope thereof. Parts and percentages referred to in the example and throughout the specification are by weight unless otherwise indicated.

EXAMPLE 1

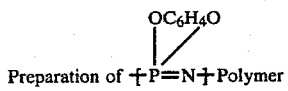

Preparation of $\pm P=N\pm$ Polymer

A 10 oz. bottle was charged with 4.85 grams (44 millimoles) of catechol, 100 cc of dry tetrahydrofuran (hereinafter THF), 12.3 cc (88 millimoles) of dry triethylamine, and 35.2 gms (39.7 millimoles) of 13.08% THF solution of poly(dichlorophosphazene) have a degree of polymerization of about 2600. After heating at 70° C. for 116 hours, the mixture was coagulated and washed in methanol to yield 5.9 gms of derivatized phosphazene polymer (96.4% yield).

The solid polymer flowed easily when pressed at 270° C. to form a self-supporting film. The polymer was shown to contain 0.31 percent Cl by elemental analysis.

EXAMPLE 2

A 28 oz. bottle was charged with 21.6 gms (196 millimoles) of catechol, 16.53 gms (359.5 millimoles) of a 50 percent sodium dispersion and 150 cc. of THF. After the evolution of hydrogen had ceased, 174.4 gms (143 millimoles) of a 9.5% solution of poly(dichlorophosphazene) in THF was added to the materials in the bottle which was then heated at 80° C. for 40 hours. The sodium was neutralized with $CO_2$ and the NaCl was removed by centrifugation. When subjected to methanol coagulation, the clear upper layer of material in the bottle yielded 5.8 gms of a solid material which had an inherent viscosity of 0.43 dl/g and contained 0.34% Na and 0.04% Cl.

The salt cake in the bottle was washed with water and yielded 6.3 gms of a grey powder containing 0.29% Na and 0.16% Cl. Both samples were pressed at 175° C. into clear films. Fibers were pulled from a melt.

EXAMPLE 3

A 28 oz. bottle was charged with 19.78 gms (179.7 millimoles) of catechol, 250 cc of THF, 40 cc (494.6 millimoles) of pyridine, and 100 cc of pentane. The materials in the bottle were heated to 70° C. to allow the water-pentane azetrope to dry. The mixture was cooled to 15° to 25° C. and 258.3 gms (162.5 millimoles) of a 7.28% solution of poly(dichlorophosphazene) in THF was added. The solution became opaque after 30 minutes from the formation of pyridine hydrochloride. The solution was maintained at 80° C. for 116 hours. The solution was centrifuged and the material was washed with methanol to yield 19.3 gms of a white powder having a $T_g$ of 12° C. and a $T_m$ of 199° C. Elemental analysis of the white powder was as follows:

|  | C | H | N | P | Cl |
|---|---|---|---|---|---|
| Actual (%) | 39.48 | 3.48 | 10.05 | 19.01 | 1.07 |
| Calculated (%)* | 39.51 | 2.54 | 9.35 | 19.39 | 1.47 |

*Based on 4.8% pyridine hydrochloride, 8.9% hydrolyzed chloropolymer and the remainder catechol derivative polymer.

EXAMPLES 4–18

The following examples were performed in the following method.

A 10 oz. bottle was charged with 100 cc THF, 12.3 cc (88 millimoles) of triethylamine and 35.4 gms (40 millimoles) of a 13.08% solution of poly(dichlorophosphazene) in THF. The following ortho-difunctional phenylene compounds listed in Table 1 were added to different 10 oz. bottles containing the above mixture and upon heating at the temperature and for the duration listed in Table 1 yielded a compound having the weight, the chlorine content, melting point ($T_m$), and glass transition temperature ($T_g$) listed in Table 1. Examples 4 to 9 add only one ortho-difunctional phenylene compound to form a homopolymer, while examples 10–18 simultaneously add two different ortho-difunctional phenylene compounds to the reaction mixture to form a copolymer.

| Ex. No. | Ortho-Difunctional Phenylene Compound* | Amount* gms. millimoles | Reaction Temp. °C. | Reaction Duration Hours | Yield gms | $T_g$ °C. | $T_m$ °C. | Percent Cl |
|---|---|---|---|---|---|---|---|---|
| 4 | Ortho-Phenylenediamine | 4.76 (44) | 70 | 116 | 1.5[1] | — | 145 | 1.16 |
| 5 | 2-aminothiophenol | 5.51 (44) | 70 | 116 | 4.9[2] | 11 | 181 | 0.57 |
| 6 | O-hydroxy benzyl alcohol | 5.46 (44) | 70 | 116 | 6.7[3] | — | 90 | 3.53 |
| 7 | 4-t-butylcatechol | 7.35 (44) | 70 | 20 | 5.87[4] | 25 | 200 | 1.35 |
| 8 | 3-methylcatechol | 5.0 (44) | 70 | 90 | 5.7[5] | 52 | 188 | 0.91 |
| 9 | 4-nitro-o-phenylene diamine | 6.74 (44) | 70 | 92 | 3.7 | 20 | 197 | 11.7 |
| 10 | catechol<br>O-phenylene diamine | 2.43 (22)<br>2.38 (22) | 70 | 68 | 4.55[6] | — | 103 | 2.93 |
| 11 | catechol<br>2-aminophenol | 2.43 (22)<br>2.40 (22) | 70 | 68 | 1.2[7] | — | 193 | 1.01 |
| 12 | catechol<br>2-aminothiophenol | 2.43 (22)<br>2.76 (22) | 70 | 68 | 5.6[8] | 2 | 191 | 1.76 |
| 13 | catechol<br>O-hydroxy benzyl alcohol | 2.43 (22)<br>2.73 (22) | 70 | 68 | 6.1[9] | 15 | 180 | 2.35 |
| 14 | catechol<br>4-t-butylcatechol | 2.43 (22)<br>3.7 (22) | 70 | 20 | 5.27[10] | −19 | 130 | 0.82 |

-continued

| Ex. No. | Ortho-Difunctional Phenylene Compound* | Amount* gms. milli-moles | Reaction Temp. °C. | Reaction Duration Hours | Yield gms | $T_g$ °C. | $T_m$ °C. | Percent Cl |
|---|---|---|---|---|---|---|---|---|
| 15 | catechol<br>3-methyl catechol | 2.43 (22)<br>2.5 (22) | 70 | 90 | 6.2[11] | — | 138 | 0.82 |
| 16 | catechol<br>4-5-butyl catechol | 2.43 (22)<br>3.7 (22) | 70 | 90 | 6.4[11] | −47 | 191 | 0.45 |
| 17 | 3-methyl catechol<br>4-t-butyl catechol | 2.5 (22)<br>3.7 (22) | 70 | 90 | 5.7[11] | — | 178 | 0.83 |
| 18 | 4-nitro-o-phenylenediamine<br>catechol | 6.74 (44)<br>4.85 (44) | 120 | 68 | 12.9[12] | −66 | 112 | — |

[1] orange powder
[2] yellow powder
[3] white powder
[4] 3.8 gms THF soluble and 2.07 gms THF insoluble white powder
[5] brown powder
[6] orange powder
[7] white powder
[8] cream powder
[9] white powder
[10] 2.07 gms THF soluble and 3.2 gms THF insoluble white powder
[11] tan powder
[12] 5.3 gms THF soluble and 7.6 gms THF insoluble brown rubber

We claim:
1. A polyphosphazene polymer containing units represented by the formulas:

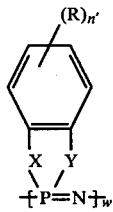

wherein X and Y are selected from the group consisting of: —CH$_2$O—, —O—, —S—, and —NH—; and R is selected from the group consisting of halogen, cyano, nitro, and alkoxy and alkyl radicals containing from 1 to 12 carbon atoms; n'=0 to 4; 20≦(w)≦50,000; and X, Y, R and n' are independently selective in each of the polymer units.

2. The polymer of claim 1 wherein X and Y are —O— and n' is zero.

3. The polymer of claim 1 wherein substituents on the polyphosphazene polymer are derived from a group consisting of o-phenylenediamine, 2-aminothiophenol, o-hydroxybenzyl alcohol, 4-t-butylcatechol, 3-methylcatechol, and 4-nitro-phenylenediamine.

4. The polymer of claim 1 wherein the polymer units are randomly distributed.

5. The polymer of claim 4 wherein substituents of the polyphosphazene polymer are derived from a mixture of compounds selected from the group consisting of catechol, o-phenylenediamine, 2-aminothiophenol, o-hydroxybenzylalcohol, 4-t-butylcatechol, 3-methylcatechol, and 4-nitro-o-phenylenediamine.

6. A method of preparing polyphosphazene polymers containing units represented by the formulas:

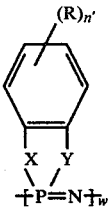

wherein X and Y are independently selected from the group consisting of: —CH$_2$O—, —O—, —S—, and —NH—; and R is selected from the group consisting of halogen, cyano, nitro, alkoxy and alkyl radicals containing from 1 to 12 carbon atoms; n'=0 to 4; 20≦w≦50,000; and X, Y and R and n' are independently selective in each of the polymer units; said method comprising reacting a poly(dichlorophosphazene) polymer having the formula —(NPCl$_2$)$_{n'}$, —, wherein n is from 20 to 50,000, with a compound selected from the group consisting of an ortho-difunctional phenylene compound having —OH, —SH, —CH$_2$OH, or —NH$_2$ functionality, and a mixture of ortho-difunctional phenylene compounds in the presence of a tertiary amine.

7. The method of claim 6 wherein the ortho-difunctional phenylene compound is catechol.

8. The method of claim 6 wherein the ortho-difunctional phenylene compound is selected from the group consisting of: o-phenylenediamine, 2-aminothiophenol, o-hydroxybenzyl alcohol, 4-t-butylcatechol, 3-methylcatechol, and 4-nitro-o-phenylenediamine.

9. The method of claim 6 wherein the mixture consists of two or more compounds selected from the group consisting of catechol, 2-aminophenol, 2-hydroxybenzyl alcohol, 4-t-butylcatechol, 3-methylcatechol, 4-nitro-o-phenylenediamine, and o-phenylenediamine.

10. The method of claim 6 wherein the tertiary amine is triethylamine.

* * * * *

UNITED STATES PATENT AND TRADEMARK OFFICE
CERTIFICATE OF CORRECTION

PATENT NO. : 4,221,898
DATED : September 9, 1980
INVENTOR(S) : William L. Hergenrother and Adel F. Halasa It is certified that error appears in the above-identified patent and that said Letters Patent are hereby corrected as shown below:

Column 7, line 53 — Claim 3

"4-nitro-phenylenediamine" should read

-- 4-nitro-o-phenylenediamine --.

Signed and Sealed this

Thirtieth Day of December 1980

[SEAL]

Attest:

SIDNEY A. DIAMOND

Attesting Officer

Commissioner of Patents and Trademarks